March 9, 1926.  1,575,607
C. ADAMS, JR
DRY PIPE VALVE
Filed August 13, 1921  3 Sheets-Sheet 1

Witnesses:
L. C. Badeau
R. D. Penney

Inventor:
Charles Adams, Jr.
By his Att'y, F. H. Richards

March 9, 1926.
C. ADAMS, JR
DRY PIPE VALVE
Filed August 13, 1921    3 Sheets-Sheet 2
1,575,607
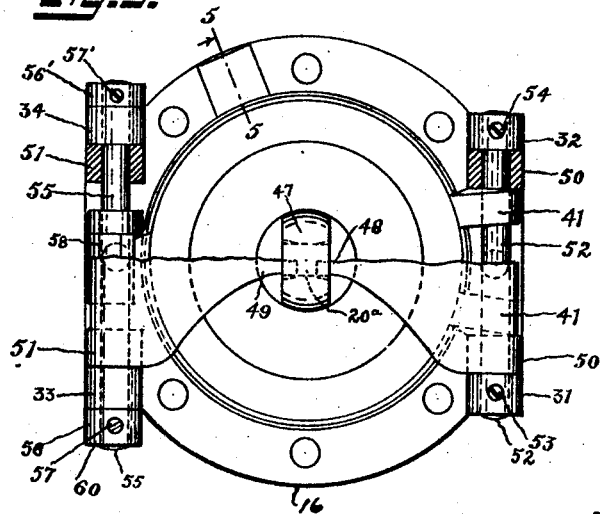
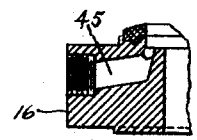
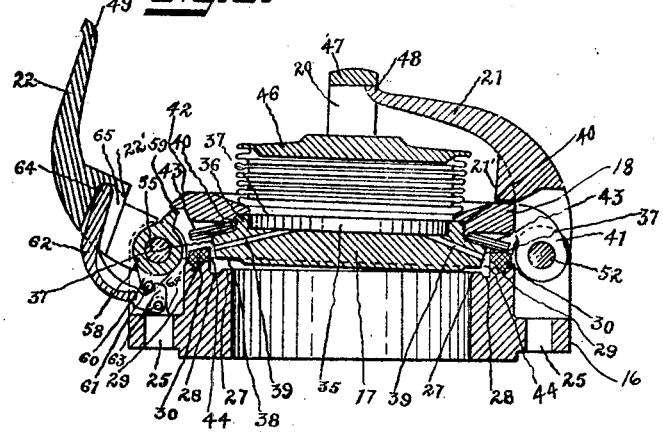
Witnesses:
L. C. Badeau
H. D. Penney
Inventor:
Charles Adams, Jr,
By his Att'y, T. H. Richards March 9, 1926.
C. ADAMS, JR
DRY PIPE VALVE
Filed August 13, 1921    3 Sheets-Sheet 3
1,575,607
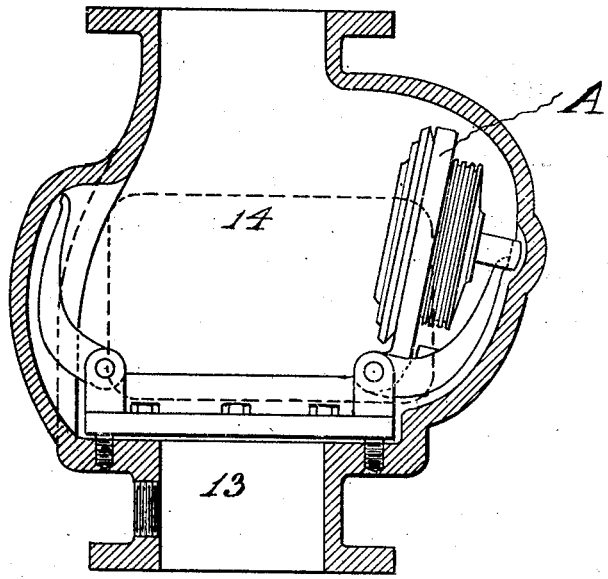
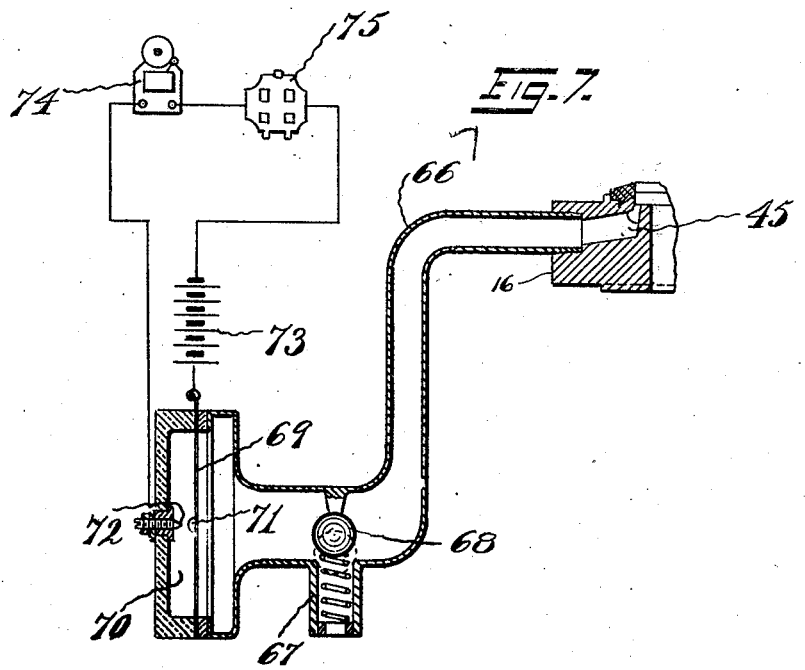
Witnesses:
L. C. Badeau
H. D. Penney
Inventor:
Charles Adams, Jr,
By his Att'y, F. H. Richard Patented Mar. 9, 1926.

1,575,607

UNITED STATES PATENT OFFICE.

CHARLES ADAMS, JR., OF CLIFFSIDE PARK, NEW JERSEY, ASSIGNOR OF ONE-HALF TO SYDNEY WESTON, OF NEW YORK, N. Y.

DRY-PIPE VALVE.

Application filed August 13, 1921. Serial No. 492,058.

*To all whom it may concern:*

Be it known that I, CHARLES ADAMS, Jr., a citizen of the United States, residing in Cliffside Park, in the county of Bergen and State of New Jersey, have invented certain new and useful Improvements in Dry-Pipe Valves, of which the following is a specification.

This invention relates to dry pipe valves for use in dry pipe systems, and a principal feature is the novel valve action control comprising a single collapsible and extensible diaphragm, the valve control holding the valve closed and locked ready for instant use, and being capable of quick and easy manual closure after opening.

Another feature is the means for retaining the valve mechanism, which when the valve is operated for opening, maintains the valve in partially open position for facilitating the full opening of the valve by water pressure.

Another feature is the means which automatically provides for drainage.

Another feature of the device conducing to ease and cheapness of manufacture, is the simplicity of construction involving no complex parts and requiring relatively small amount of material.

One new and very important feature is that the present construction admits of substantially immediate substitution of one valve mechanism for another valve mechanism without removing the valve casing from the system, whereby should any valve unit or assembly get out of order it may readily be replaced by the mere act of loosening the damaged valve means and the replacement or substitution thereof by a new and operative valve means.

It is further proposed that a system may be installed wherein part of the same may be a dry pipe system and part a wet pipe system, or the entire system may be changed from a dry pipe system to a wet pipe system, as is the common practice during the summer months, or for use in warm climates. The reason for this use of a wet pipe system is owing to the fact that in warm weather or in a warm climate there is no tendency for the pipes to freeze and the water is brought in readiness closer to the fire during the period when the freezing of the pipes is not a possibility, my invention permitting of use in this manner or use as a dry pipe and wet pipe system if desirable. In addition, owing to the unit type of construction of the valve mechanism, it is easily removable for adjustment and repair, and owing to the peculiarity of its structure, means are also provided whereby an alarm may be given to any desired point upon the operation of the valve under normal active condition. That is to say, means are shown, reference being had to Figs. 2, 4, 5 and 7, whereby under fire hazard, the drain system of my device may be so utilized as to permit of a flow of fluid through a hydrostatic valve action whereby an alarm may be delivered to a distant or desired point for notification purposes. Thus, it will be seen that this particular form of valve while primarily arranged for dry pipe use is also adaptable to wet pipe systems, and also dry and wet pipe systems with or without alarm accessories.

These and other features and capabilities of my invention will be disclosed in the course of the following description.

Referring to the accompanying drawings which form part of this specification and which show one embodiment of my invention, Figure 1, is a side or horizontal view, the housing or case being in vertical section.

Figure 3, is a plan view partly in horizontal section, and partly broken away.

Figure 4, is a sectional view similar to Fig. 2, showing the valve in the course of opening maintained in partially open position for facilitating full opening thereof by water pressure.

Figure 5, is a fragmentary detail sectional view on the line 5—5 of Fig. 3, and pertaining to the drainage feature of my device.

Figure 6, is a sectional view showing the valve mechanism, generally denoted by A, in open position and permitting communication between the air pressure and water pressure chambers.

Figure 7, is a detail view, on an enlarged scale and partly in section, for illustrating the alarm feature of my device, Similar reference characters denote similar parts throughout the several views.

Figure 1:
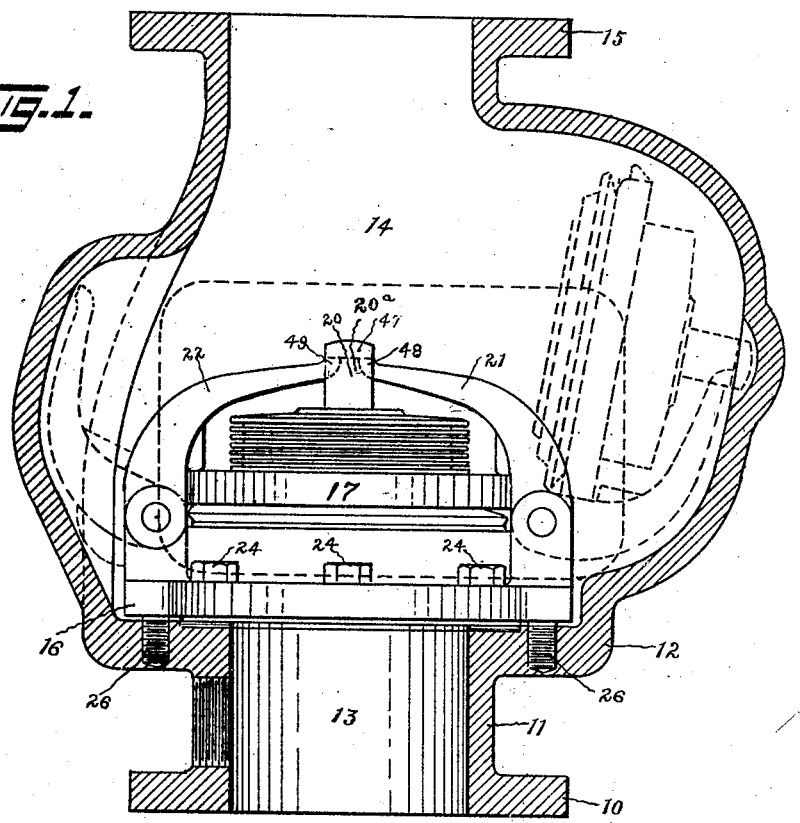

My device comprises generally the housing or case, and the valve mechanism enclosed thereby.

The housing or case comprises the lower attachment flange 10, the vertical pipe length or vertical extension 11, and the lateral extension 12, the housing being open at its bottom and open at the upper line of the extension 12, and the combined interior portions of the flange 10, the pipe length 11 and extension 12 forming the lower portion of the water pressure chamber 13 of the device.

The lateral extension 12 is extended upwardly and outwardly, preferably as shown in Fig. 1, to provide the interior space 14, suitable for containing the valve mechanism in open or closed position, the space 14 forming the air pressure chamber of the device. The housing is open at its upper end and is there provided with the upper attachment flange 15.

The valve mechanism comprises the base member or portion 16, the valve member 17, the supporting ring 18, the collapsible and extensible member such as a bellows-like member 19 having the lock member 20, and the locking arms 21 and 22, having respectively the shoulders 21′ and 22′.

The base member 16 is substantially circular having a bore or interior space 23 therethrough, which, when the base member is in assembled position in the device, communicates with and forms the upper portion of the water pressure chamber 13. The base member 16 is secured to the lateral extension 12 of the housing in a water tight manner, as by the threaded bolts 24 passing through apertures 25 in the base member and engaging threaded apertures 26 in the extension 12.

The upper straight edge or face of the base member 16 provides the annular valve seat 27 for the valve face member 17.

The base member 16 has formed therein adjacent to the valve seat 27, the annular channel 28, and has formed therein adjacent to the channel 28 the irregular faced annular groove 29 for securing therein by compression, or in other suitable water tight manner, the upstanding ring 30, of lead or other suitable soft metal, the purpose of the channel 28 and ring 30 being later stated.

The base member 16 is provided on two opposite sides with the outwardly extending apertured lugs 31, 32 33 and 34, Fig. 3.

The valve member 17 is circular, and has its upper interior cut away to provide the shallow space or chamber 35, surrounded by the low annular vertical wall 36, which wall is threaded on its exterior.

The valve member 17, at its outer edge adjoining and below the wall 36 is extended at an incline outwardly and downwardly and downwardly and inwardly to form the annular ledge 37, the under side or face of which provides the valve face 38 for engaging the valve seat 27. The ledge 37 has extending therethrough the inwardly and upwardly inclined annular passageway 39 which provides communication from the downwardly and inwardly inclined face of the ledge 37 to the shallow interior space or chamber 35 of the valve member.

The supporting ring 18 has its upper surface depressed or dished towards its central opening, and is provided in its edge at the central opening with the annular rabbet or groove 40, which is threaded on its vertical face for thereby securing the supporting ring 18 to the threaded wall 36 of the valve member. The supporting ring 18 has on its periphery at one side thereof the apertured lugs 41, and has its periphery, for a portion thereof opposite to said lugs, formed to provide the outwardly extending lip 42.

When the valve member 17 and the supporting ring 18 are in assembled relation, the ring 43 of rubber or other yieldable air and water tight material is compressed or squeezed between the extending lower surface of the supporting ring and the upper inclined surface of the ledge 37, the ring 43 providing a flexible member which is engageable with the upper face of the lead or soft metal ring 30. There is space 44 formed by the channel 28 and located between the inner vertical face of the soft metal ring 30 and the lower inclined face of the ledge 37, which space communcates with the passageway 39 of the valve member 17, and communicates with the atmosphere by the passageway 45, shown in Figs. 3 and 5, the engagement of the yieldable ring 43 and the upper face of the metal ring 30 providing means for preventing escape of air from the air pressure chamber into the space 44.

The extensible member 19 is of convoluted or accordion form, and is secured at its lower edge to the edge of the central open portion of the supporting ring 18. The extensible member 19 has a cover or top-piece 46 having the upwardly extending lock member 20 thereon, which member 20 is cut away interiorly to provide a slot having a head 47 with which the locking arms 21 and 22 engage when inserted in said slot. The bottom or floor of the chamber 35 provides the bottom for the interior space comprised within the extensible member 19.

The locking arms 21 and 22 are preferably of the shape shown in the drawings, that is, they are curving concave-convex wing-shaped, being thickest and widest at their outer or lower ends and reduced in thickness and width towards their inner or upper ends 48 and 49 for engagement of these ends with the slot of the locking member 20 under the head 47, and are provided at their lower or outer ends with the pairs of apertured lugs 50 and 51.

The locking arm 21 the extensible member 19, the supporting ring 18, and the valve member 17 are assembled in operative relation by passing the pivot pin or shaft 52 through the lugs 31 of the base member 16, through the lugs 50 of the locking arm 21, through the lugs 41 of the supporting ring 18, and through the lug 32 of the base member, the pivot pin 52 being fixedly attached to the lugs 31 and 32 by the set screws 53 and 54, the lugs 50 and 41 being loose upon the pivot pin. The extensible member 19 and supporting ring 18 overlie the valve member 17, and the locking arm 21 overlies them all, and all these members are pivotally movable on the pivot pin 52.

For supporting the locking arm 22 in position for co-operating with the locking arm 21 the pivot pin 55 is passed through the lug 33 of the base member 16, through the lugs 51 of the locking arm 22, and through the lug 34 of the base member, the pivot pin 55 being provided adjacent to the lugs 33 and 34 with the stop collars 56 and 56' fixedly attached to the pivot pin 55 by the set screws 57 and 57', the last mentioned lugs being loose upon the pivot pin 55.

Figure 2:
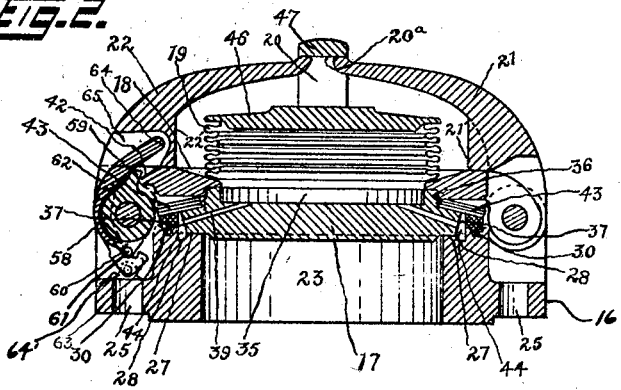
Figure 2, is a vertical sectional view of the valve mechanism.

For providing means for co-operating with the locking arms 21 and 22 for locking the valve mechanism in closed position, and for maintaining the valve mechanism in partial open position for facilitating movement of the valve mechanism to full open position by water pressure, the dog 58 is loosely attached to the pivot pin 55. The dog 58 has at its upper end a nose 59, and is extended at its lower end 60 and provided with a projecting pin 61. The curved lever member 62, which co-operates with the dog 58, has a hooked lower end 63, and is secured at its lower end, as by the lug 64', to the base member 16 adjacent to the lower end of the dog 58, the hooked end 63 being engageable with the pin 61 to move the nose 59 of the dog downwardly and inwardly when the lever member 62 is moved radially and outwardly. The curved upper end 64 of the lever member is located and movable in a cut away or removed portion 65 of the locking arm 22, the lever member being limited in outward radial movement by engagement of its curved end 64 with the outer wall of the cut away or removed portion 65 of the locking arm 22. Upward and outward movement of the dog 58 is limited by engagement of the outer side of the nose 59 with the adjacent curved upper end 64 of the lever member. When the nose 59 is in engagement, as shown in Fig. 2, with the lip 42 of the supporting ring 18, and held in this position by the shoulder 22' of the locking arm 22, upon lessening of air pressure and extension of the extensible member 19, the locking arm 22 will be released, and due to water pressure on the valve member 17 the locking arm 22 will be moved upwardly and outwardly. The nose 59 of the dog will thereby be disengaged from the lip 42 of the supporting ring 18, and by engagement of the hooked end 63 of the lever member with the pin 61 of the dog 58, during outward and upward movement of the lever member, the nose 59 of the dog will be moved downwardly and inwardly and will be brought into engagement with the under side or lodged under, the lip 42 of the supporting ring 18, as shown in Fig. 4, thereby holding the valve member 17 in partial open position and facilitating further movement of the valve member by water pressure to full open position.

Referring to Figs. 5 and 7, the means for alarm comprises a drain pipe or conduit 66, communicating at one end with the channel or passageway 45, and having a drip outlet 67 controlled by a check valve, such as the spring supported stop limited ball valve 68. The pipe 66 is arranged at its other end for contact of water flowing in the pipe with a flexible metal cross plate 69 arranged in the chamber 70, this end of the pipe 66 preferably but not necessarily being closed by the plate 69 against passage of water into the chamber 70, it being necessary however that the plate 69, whether closing this end of the pipe 66 or not, should be of such size as to present sufficient surface to enable the pressure of water in the pipe 66 to flex or bend the plate outwardly for the purpose of making control between the electric contacts later mentioned for operating the alarm. The cross plate 69 is provided on the side thereof opposite to the adjacent end of the pipe 66 with an electric contact 71, and an electric contact 72 is provided in the wall of the chamber 70 adjacent to the contact 71, the plate 69 being connected to a conveniently situated source of electricity, such as the battery 73, and the contact 72 being connected to a bell or other audible alarm means 74 connected to an annunciator or other visual alarm means 75 connected to the battery 73, the contacts 71 and 72 normally being out of contact.

For normally providing drainage for the valve mechanism the check valve 68 is maintained in open position as shown, but upon emergency operation of the valve mechanism by water pressure, the pressure of the increased amount of water in the pipe 66 will close the check valve 68 and will flex or bend the cross plate 69 outwardly and make contact between the contacts 71 and 72 and cause operation of the alarm means. To discharge subsequently the accumulated water from the pipe 66, it is only necessary to hold the check valve 68 in open position by means of a stick or suitable instrument inserted into the outlet 67 until the water passes out of the pipe by way of the outlet. Or, as may be readily understood, a relief valve, not shown, may be placed in the pipe 66 between the outlet 67 and the chamber 70 for discharge of the accumulated water.

The housing or case of the device may be provided with suitable hand holes or openings, not shown, for permitting access to the interior of the housing for manually closing the valve mechanism, and for adjustment, repair or cleaning out purposes.

In operation: The valve mechanism being in closed position as shown in Figs. 1 and 2, the locking arms 21 and 22 being engaged in the slot and under the head 47, of the lock member, and the shoulders 21' and 22' of the respective locking arms being in engagement with the upper surface of the supporting ring 18, and the nose of the dog 58 being engaged with the upper edge of the lip 42 of the supporting ring 18, and the extensible member 19 being collapsed or compressed by pressure thereon of the air in the chamber 14, and the valve mechanism locked and held against the pressure of water from the chamber 13, reduction of this air pressure causes the extensible member to extend, whereby the lock member 20, together with the extensible member is moved upwardly and the end 49 of the locking arm 22 is released from the head 47. Due to the reduction of air pressure the water pressure causes upward and radial movement of the valve member 17, the supporting ring 18 and the extensible member 19, and the shoulder 22' of the locking arm 22 being in engagement with the upper edge of the supporting ring, the upward and radial movement of the supporting ring by engagement of the upper edge thereof with the shoulder 22' pushes the unlocked arm 22 out of the way. During this movement of the supporting ring the nose of the dog 58 slips off the upper edge of the lip 42 of the supporting ring and by action of the lever member 62 is carried and lodges under the lip 42, and thereby maintains the valve mechanism in partial open position as shown in Fig. 4 and permits the full opening of the valve mechanism by water pressure from the chamber 13, or movement of the valve mechanism to the open position shown by the broken lines in Fig. 1.

The annular passageway 39 in the valve member 17 communicating with the chamber 35 and with the passageway 45, which in turn communicates with the atmosphere, permits collapsing and extension of the extensible member 19. Also when the valve member 17 is unseated, the water will enter the chamber 35 by this passageway and by pressure on the interior of said chamber assist in moving the valve member to open position. This passageway also provides a means for automatically draining, after the valve mechanism is returned to closed position, any water that may have entered the interior of said chamber by way of the passageway during flow of water through the device while the valve mechanism was in open position.

While for convenience and for purposes of manufacture I employ a housing such as shown, it should be noted that the valve mechanism is self-contained and is not restricted to use with any particular form of housing; that is, the valve mechanism is comprised of the base member, the valve member, the supporting ring, the extensible member and the locking arms, all of the latter members being operatively supported by the base member and not dependent for support upon any other means than the base member. The only requisite is that the water pressure and air pressure chambers should be arranged relative to the valve mechanism for co-operation therewith for providing water and air pressure thereon, whether the water pressure and air pressure chambers are formed in a single housing or each has an individual housing. The advantage of this feature of my invention is that the operative parts of the valve mechanism being supported in operative relation to each other by the base member and the valve mechanism being supported in operative relation to the air and water pressure chambers by the base member, the valve mechanism may be used with any form of housing or housings for the water pressure and air pressure chambers which permit arrangement of these chambers to meet the above requisite. Thus the air pressure and water pressure chambers not being restricted to any particular form, or necessarily adjacently arranged relative to each other, may be adapted to the conditions of place where used, so long as means is provided for bringing these chambers into such relation to the valve mechanism that air pressure from the air pressure chamber and water pressure from the water pressure chamber are exerted upon the valve mechanism, and that the valve mechanism may provide means for closing or opening communication between these chambers and permit, when operated by excess of water pressure, passage of water from the water pressure chamber through the valve mechanism to the air chamber for distribution in emergency.

For use of my device as a wet pipe system, water may be forced in a suitable and convenient manner, not shown, but readily to be understood, into the sprinkler pipes of the system and thence into the air chamber, the pressure in the air chamber then being that of water instead of air, and the action of the valve mechanism being the same as when under air and water pressure. In emergency upon reduction of the water pressure in the air chamber, the excess of water pressure from the water chamber moving the valve mechanism to open position permits distribution of the water from the sprinkler pipes and air chamber by water pressure from the water chamber and a subsequent flow of water therefrom.

It will be noted from the foregoing description thereof that the self-contained valve mechanism, simply by disconnecting it from communicating position between the respective pressure chambers, may be removed from the system for inspection, cleaning or repair, or for the substitution of a similar new valve mechanism for an old one.

It will be noted by referring to Figs. 1 and 2, that there is provided a space 20ª between the arms 21 and 22, and it has been found in practice that this is a very important provision, in order to definitely meet a characteristic action of this valve under normal operative position. In other words, while it may be assumed that under ordinary air-pressure conditions in the chamber 14, the valve mechanism will be set about as shown, and the locking arms 21 and 22 will be in about the set position as shown. Should any increase of pressure be applied however, or should inadvertent variations of pressure occur, the extensible member 19 would be compressed, carrying with it the head 46 and member 47. This action would, not unnaturally, tend to carry the arms 21 and 22 downwardly therewith to a point where the ends 48 and 49 thereof approach one another, and should there not be a clearance space 20ª, as referred to, the arms 21 and 22 might contact together at the ends 48 and 49 and thereby be badly deformed. In order to obviate this particular feature, sufficient space is left between the ends 48 and 49 of the arms 21 and 22, as above noted, in order to accommodate variations of increased pressure without incapacitating the arms 21 and 22 after proper operative function.

Having thus described my invention, it should be understood that there may be modifications thereof and variations therein without departing from the spirit of the invention or exceeding the scope of the appended claims.

What I claim and desire to protect by Letters Patent is:—

1. In combination, an air pressure chamber; a water pressure chamber; and self-contained valve mechanism for closing or opening communication between said chambers; the valve mechanism comprising a base member for supporting the operative parts of the valve mechanism in operative relation to each other, and for supporting the valve mechanism in operative relation to the water pressure and air pressure chambers; and comprising collapsible and extensible means for retaining when collapsed by pressure of air in the air pressure chamber the valve mechanism in locked position, and for permitting movement of the valve mechanism to open position by pressure from the water pressure chamber upon reduction of the pressure in the air pressure chamber and extension of said means.

2. In combination, an air pressure chamber; a water pressure chamber; and self-contained valve mechanism for closing or opening communication between said chambers; the valve mechanism comprising a base member for supporting the operative parts of the valve mechanism in operative relation to each other, and for supporting the valve mechanism in operative relation to the water pressure and air pressure chambers; and comprising collapsible and extensible means for retaining when collapsed by pressure of air in the air pressure chamber the valve mechanism in closed position, and for permitting movement of the valve mechanism to open position by pressure from the water pressure chamber upon reduction of the pressure in the air pressure chamber and extension of said means.

3. In combination, an air pressure chamber; a water pressure chamber; and self-contained valve mechanism for closing or opening communication between said chambers; the valve mechanism comprising a base member for supporting the operative parts of the valve mechanism in operative relation to each other, and for supporting the valve mechanism in operative relation to the water pressure and air pressure chambers; and comprising collapsible and extensible convoluted means for retaining when collapsed by pressure of air in the air pressure chamber the valve mechanism in closed position, and for permitting movement of the valve mechanism to open position by pressure from the water pressure chamber upon reduction of the pressure in the air pressure chamber and extension of said means.

4. In combination, an air pressure chamber; a water pressure chamber; and valve mechanism for closing or opening communication between said chambers; the valve mechanism comprising means for locking the same in closing position pivotally mounted for radial movement, collapsible and extensible means for retaining when collapsed by air pressure thereon said locking means in locking position, and extensible upon reduction of said air pressure for releasing said locking means for permitting movement of the valve mechanism to open position, and comprising means co-operating with said locking means for retaining the valve mechanism in closing position and movable by opening movement of the valve mechanism, when the locking means is released, to a position adapted to hold the valve mechanism in partially open position for facilitating movement of the valve mechanism by water pressure to full open position.

5. In combination, an air pressure chamber; a water pressure chamber; and valve mechanism for closing or opening communication between said chambers; the valve mechanism comprising pivotally mounted locking arms for retaining the valve mechanism in closing position, and collapsible and extensible means for retaining when collapsed the locking arms in locking position, and extensible for releasing said locking arms for permitting movement of the valve mechanism to open position.

6. In combination, an air pressure chamber; a water pressure chamber; and valve mechanism for closing or opening communication between said chambers; the valve mechanism comprising locking arms pivotally mounted in the air pressure chamber for retaining the valve mechanism in closing position, and differentially controlled collapsible and extensible means for retaining when collapsed the locking arms in locking position, and extensible for releasing the locking arms for permitting movement of the valve mechanism to open position.

7. In combination, an air pressure chamber; a water pressure chamber; valve mechanism for closing or opening communication between said chambers; the valve mechanism comprising pivotally movable locking arms for retaining the valve mechanism in closing position, and collapsible and extensible means for retaining when collapsed by air pressure thereon the locking arms in locking position, and extensible upon reduction of said air pressure for releasing the locking arms for permitting movement of the valve mechanism by water pressure to open position; and means engageable with the valve mechanism and co-operating with the locking arms for maintaining the valve mechanism in closing position and movable by opening movement of the valve mechanism, when the locking arms are released, and engageable with the valve mechanism adapted to hold the valve mechanism in partial open position for facilitating movement of the valve mechanism by water pressure to full-open position.

8. In combination, an air pressure chamber; a water pressure chamber; valve mechanism for closing or opening communication between said chambers, comprising collapsible and extensible means; means communicating with the interior of said collapsible and extensible means and with the atmosphere for permitting collapsing and extension of the collapsible and extensible means and providing for drainage of said interior; and means for preventing passage of air from the air pressure chamber into said communicating means.

9. In combination, an air pressure chamber; a water pressure chamber; valve mechanism for closing or opening communication between said chambers, comprising collapsible and extensible means; and means communicating with the interior of the collapsible and extensible means and with the atmosphere for permitting collapsing and extension of the collapsible and extensible means and providing for drainage of said interior; said means for communication comprising an inclined annular passageway in the valve mechanism communicating with an annular passageway therein which in turn communicates with the atmosphere.

10. In combination, an air pressure chamber; a water pressure chamber; valve mechanism for closing or opening communication between said chambers, comprising collapsible and extensible means; means communicating with the interior of said collapsible and extensible means and with the atmosphere for permitting collapsing and extension of the collapsible and extensible means and providing drainage for said interior; and means for preventing passage of air from the air pressure chamber into said means for communication; said means for communication comprising an inclined annular passageway in the valve mechanism communicating with an annular passageway therein which in turn communicates with the atmosphere; and said means for preventing passage of air comprising a ring of yieldable material engageable with a ring of soft metal.

11. In combination, pressure chambers; self-contained chambered valve mechanism for closing or opening communication between the chambers; and means for draining the valve mechanism from within; said chambers having pressure therein opposedly exerted from the chambers upon the valve mechanism for normally maintaining the same in closing position; the valve mechanism upon reduction of the pressure thereon from one of said chambers being movable to open position by pressure from the other of said chambers.

12. In combination, pressure chambers; self-contained chambered valve mechanism for closing or opening communication between the chambers; and means for draining the valve mechanism from within; said chambers having pressure therein opposedly exerted upon the valve mechanism for normally maintaining the same in closing position; the valve mechanism upon reduction of the pressure from one of said chambers being movable to open position by pressure from the other of said chambers; the valve mechanism comprising means for supporting the operative parts of the valve mechanism in operative relation to each other, and for supporting the valve mechanism in operative relation to said chambers.

13. In combination, pressure chambers; self-contained chambered valve mechanism for closing or opening communication between the chambers; and means for draining the interior of the valve mechanism; the valve mechanism comprising collapsible and extensible means for retaining when collapsed by pressure thereon from one of said chambers the valve mechanism in closing position, and by extension of said collapsible means upon reduction of said pressure permitting movement of the valve mechanism to open position by pressure from the other of said chambers.

14. In combination, a housing comprising an air pressure chamber and a water pressure chamber; a base member secured to the housing between said chambers providing communication therebetween and having a face providing a valve seat; a valve member having a valve face engageable with said valve seat; a supporting ring secured to the valve member and pivotally attached at one side to the base member; a collapsible and extensible member secured to the supporting ring; means communicating with the atmosphere for permitting collapsing and extension of the collapsible and extensible member; and locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member.

15. In combination, a housing comprising an air pressure chamber and a water pressure chamber; a bored base member secured to the housing between said chambers providing communication therebetween, and having a face providing a valve seat; a valve member having a valve face engageable with said valve seat; a supporting ring secured to the valve member and pivotally attached at one side to the base member; a collapsible and extensible member secured to the supporting ring; means communicating with the atmosphere for permitting collapsing and extension of the collapsible and extensible member and providing for drainage of the interior thereof; and locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member.

16. In combination, a housing comprising an air pressure chamber and a water pressure chamber; a bored base member secured to the housing between said chambers providing communication therebetween having a face providing a valve seat; a valve member having a valve face engageable with said valve seat; a supporting ring secured to the valve member and pivotally attached at one side thereof to the base member; a collapsible and extensible member secured to the supporting ring; means communicating with the atmosphere for permitting collapsing and extension of the collapsible and extensible member; and locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member; the locking arms having shoulders engageable with the upper side of the supporting ring when in locking position.

17. In combination, a housing comprising an air pressure chamber and a water pressure chamber; a bored base member secured to the housing between said chambers providing communication therebetween having a face providing a valve seat; a valve member having a face engageable with said valve seat; a supporting ring secured to the valve member and pivotally attached at one side to the base member; a collapsible and extensible member secured to the supporting ring; means communicating with the atmosphere for permitting collapsing and extension of the collapsible and extensible member; locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member, the locking arms having shoulders engageable with the upper side of the supporting ring when in locking position; pivotally movable means engageable with the upper side of the edge of the supporting ring when said ring is in normal position, and for moving said means for engagement thereof with the under side of the edge of the supporting ring when said ring is moved upwardly.

18. In combination, a housing comprising an air pressure chamber and a water pressure chamber; a bored base member secured to the housing between said chambers providing communication therebetween having a face providing a valve seat; a valve member having a face engageable with said valve seat; a supporting ring secured to the valve member and pivotally attached at one side to the base member; a collapsible and extensible member secured to the supporting ring; means communicating with the atmosphere for permitting collapsing and extension of the collapsible and extesible member; locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member; the locking arms having shoulders engageable with the upper side of the supporting ring when in locking position; a pivotally movable dog having a nose engageable with the upper side of the edge of the supporting ring, the dog being movable by upward movement of the supporting ring and the nose thereof then being engageable with the under side of the edge of the supporting ring; and a lever member for retaining said nose in engagement with the upper side of the edge of the supporting ring when said ring is in normal position, and for moving the dog for engagement of the nose thereof with the under side of the edge of the supporting ring when said ring is moved upwardly.

19. In combination, a housing comprising an air pressure chamber and a water pressure chamber; a bored base member secured to the housing between said chambers providing communication therebetween having a face providing a valve seat; a valve member having a face engageable with said valve seat; a supporting ring secured to the valve member and pivotally attached at one side to the base member; a collapsible and extensible member secured to the supporting ring; means communicating with the atmosphere for permitting collapsing and extension of the collapsible and extensible member; locking arms pivotally attached to the base member and engageable with means on the collapsible and extensible member for retaining the valve face of the valve member in engagement with the valve seat of the base member when the collapsible and extensible member is collapsed, and releasable by extension of the collapsible and extensible member for permitting unseating movement of the valve member, the locking arms having shoulders engageable with the upper side of the supporting ring when in locking position; a pivotally movable dog having a nose and having an extended lower end with a projecting pin thereon, said nose being engageable with the upper side of the edge of the supporting ring, the dog being movable by upward movement of the supporting ring and said nose then being engageable with the under side of the edge of the supporting ring; and a lever member arranged and supported for retaining said nose in engagement with the upper side of the edge of the supporting ring when said ring is in normal position, and provided with a hooked end engageable with said pin of the dog for moving the dog for engagement of the nose thereof with the under side of the edge of the supporting ring when said ring is moved upwardly.

20. In combination, a housing comprising an air pressure chamber and a water pressure chamber; a bored base member secured to the housing between said chambers providing communication therebetween having a face providing a valve seat and having an upstanding lead ring adjacent to said face; a valve member having a face engageable with said valve seat; a supporting ring secured to the valve member and pivotally attached at one side to the base member; a ring of rubber arranged between the supporting and the valve member and engageable with said lead ring; a collapsible and extensible member secured to the supporting ring; means communicating with the atmosphere for permitting collapsing and extension of the collapsible and extensible member; and locking arms pivotally attached to the base member and engageable with means on the collapsible and extensible member for retaining the valve face of the valve member and the valve seat of the base member in closed position when the collapsible and extensible member is collapsed, the valve member being releasable by extension of the collapsible and extensible member for permitting movement of the valve member to open position.

21. In a device of the class described, the combination with a dry and wet pressure chamber, of a base, valve mechanism pivotally mounted on said base for closing or opening communication between said chambers, locking arms associated with said valve mechanism for retaining the valve in open or closed position, extensible means for actuating said locking arms, and auxiliary locking means operable by the action of the extensible means for cooperating with the locking arms.

22. In a device of the class described, the combination with a dry and wet pressure chamber, of a base, valve mechanism pivotally mounted on said base for closing or opening communication between said chambers, locking arms associated with said valve mechanism for retaining the valve in open or closed position, extensible means for actuating said locking arms, and auxiliary locking means, operable by the action of the extensible means for retaining said valve in closed position on the downward pressure of the extensible means, and operable, when the valve mechanism is open, for preventing its return to set position.

CHARLES ADAMS, JR.